(12) United States Patent
Musto (10) Patent No.: US 7,900,392 B2
(45) Date of Patent: Mar. 8, 2011

(54) STRIPPING BASKET FOR FLY FISHING

(76) Inventor: Albert C. Musto, Milford, NJ (US)

( * ) Notice: Subject to any disclaimer, the term of this patent is extended or adjusted under 35 U.S.C. 154(b) by 0 days.

(21) Appl. No.: 12/217,968

(22) Filed: Jul. 10, 2008

(65) Prior Publication Data

US 2010/0005705 A1   Jan. 14, 2010

(51) Int. Cl.
*A01K 97/06* (2006.01)
*A01K 97/10* (2006.01)
*A01K 97/00* (2006.01)

(52) U.S. Cl. .............. 43/54.1; 43/4; 43/21.2; 224/920; 224/922; 224/660; 224/676; 224/245; 206/315.11; 206/477; 206/475; 206/481; 220/6; 220/666

(58) Field of Classification Search ............. 43/4, 54.1, 43/21.2; 224/920, 922, 191, 660, 676, 678–681, 224/242, 245; 206/315.11, 477–483, 557, 206/565; 220/6, 9.1, 9.2, 9.3, 666; 383/121.1, 383/121, 114, 120, 105, 117
See application file for complete search history.

(56) References Cited

U.S. PATENT DOCUMENTS

| | | | | | |
|---|---|---|---|---|---|
| 532,737 | A | * | 1/1895 | Miles | 224/679 |
| 638,332 | A | * | 12/1899 | Hendricks | 224/679 |
| 648,712 | A | * | 5/1900 | Rivers | 220/6 |
| 695,576 | A | * | 3/1902 | Migliardi | 224/245 |
| 938,293 | A | * | 10/1909 | Wakefield et al. | 43/54.1 |
| 955,164 | A | * | 4/1910 | Husted | 224/191 |
| 1,053,749 | A | * | 2/1913 | Stebbins | 224/678 |
| 1,109,161 | A | * | 9/1914 | Chindgren | 43/54.1 |
| 1,478,497 | A | * | 12/1923 | Welch | 224/920 |
| 1,484,399 | A | * | 2/1924 | Kroha | 43/54.1 |
| 1,486,470 | A | * | 3/1924 | Welch | 224/920 |
| 1,549,400 | A | * | 8/1925 | Wimler | 43/54.1 |
| 1,633,991 | A | * | 6/1927 | Lifton | 220/6 |
| 1,711,677 | A | * | 5/1929 | Hansen | 224/920 |
| 2,098,636 | A | * | 11/1937 | Smith et al. | 43/54.1 |
| 2,149,482 | A | * | 3/1939 | Whitaker | 43/54.1 |
| 2,475,914 | A | * | 7/1949 | Peterson | 224/920 |
| 2,490,279 | A | * | 12/1949 | Nunamaker | 43/4 |
| 2,538,576 | A | * | 1/1951 | Mavrakis | 43/54.1 |
| 2,576,624 | A | * | 11/1951 | Miller | 43/21.2 |
| 2,580,912 | A | * | 1/1952 | Hawthorne | 43/54.1 |
| 2,580,913 | A | * | 1/1952 | Hawthorne | 224/920 |
| 2,677,486 | A | * | 5/1954 | Schermerhorn | 43/54.1 |
| 2,717,391 | A | * | 9/1955 | Bracken | 43/54.1 |

(Continued)

FOREIGN PATENT DOCUMENTS

GB    2343097 A  *  5/2000

(Continued)

*Primary Examiner* — Darren W Ark (74) *Attorney, Agent, or Firm* — Eugene E. Renz, Jr.

(57) ABSTRACT

An improved stripping basket for fly fishing is disclosed. The stripping basket is easily compacted for stowing while on board a boat, or for packing the stripping basket in a suitcase for travel to a fishing destination. The basket comprises multiple removable line separators and drainage holes in a base plate. The base plate folds towards the front wall of the stripping basket. The front wall has multiple slits that correspond to the arrangement of the line separators. With the line separators still attached to the base plate, the stripping basket can be quickly unfolded for use. This is convenient when on board a boat, awaiting a turn to fish. For longer term storage, such when packing in a suitcase for travel, the line separators can be removed for maximum portability.

3 Claims, 10 Drawing Sheets

U.S. PATENT DOCUMENTS

| | | | | |
|---|---|---|---|---|
| 2,735,596 A * | 2/1956 | Smedley et al. | | 43/21.2 |
| 2,781,958 A * | 2/1957 | Lewandowski | | 224/922 |
| 2,795,889 A * | 6/1957 | Garland | | 224/920 |
| 2,813,669 A * | 11/1957 | Frieder et al. | | 224/681 |
| 2,817,472 A * | 12/1957 | Parkhurst | | 224/920 |
| 2,822,116 A * | 2/1958 | Smalley et al. | | 224/679 |
| 2,823,971 A * | 2/1958 | Hoyt | | 43/54.1 |
| 2,846,129 A * | 8/1958 | O'Brien | | 224/922 |
| 2,850,220 A * | 9/1958 | Ehrler et al. | | 43/54.1 |
| 2,899,103 A * | 8/1959 | Ebert | | 43/54.1 |
| 2,973,125 A * | 2/1961 | Parry | | 224/922 |
| 2,996,227 A * | 8/1961 | Andrew | | 224/920 |
| 3,148,811 A * | 9/1964 | Foltz | | 43/54.1 |
| 3,151,790 A * | 10/1964 | Mavrakis | | 43/54.1 |
| 3,317,097 A * | 5/1967 | Giordano | | 224/920 |
| 3,401,857 A * | 9/1968 | Wilson et al. | | 224/920 |
| 3,678,611 A * | 7/1972 | Files | | 43/54.1 |
| 3,874,573 A * | 4/1975 | Fruscella et al. | | 43/21.2 |
| 4,043,754 A * | 8/1977 | Sklar | | 206/370 |
| 4,208,826 A * | 6/1980 | Lindaman | | 224/920 |
| 4,297,802 A * | 11/1981 | Normann | | 43/4 |
| 4,323,181 A * | 4/1982 | Spasoff | | 43/54.1 |
| 4,402,471 A * | 9/1983 | Normann | | 43/4 |
| D272,663 S * | 2/1984 | Forsberg | | D28/38 |
| 4,463,789 A * | 8/1984 | Leiserson | | 224/245 |
| 4,587,757 A * | 5/1986 | Lirette | | 43/21.2 |
| 4,733,806 A * | 3/1988 | Sloop | | 224/610 |
| 4,836,428 A * | 6/1989 | Evans et al. | | 224/679 |
| 4,896,806 A * | 1/1990 | Sanchez, Jr. | | 224/678 |
| 4,988,024 A * | 1/1991 | Weber | | 224/679 |
| 5,052,146 A * | 10/1991 | Resnick | | 43/21.2 |
| 5,092,263 A * | 3/1992 | Hutchison et al. | | 43/54.1 |
| 5,125,183 A * | 6/1992 | Tisdell | | 43/54.1 |
| 5,182,877 A * | 2/1993 | Burchill et al. | | 43/54.1 |
| 5,205,448 A * | 4/1993 | Kester et al. | | 224/240 |
| 5,297,355 A * | 3/1994 | O'Brien | | 43/4 |
| 5,319,874 A * | 6/1994 | Vance | | 206/315.11 |
| D349,773 S * | 8/1994 | Malin et al. | | D24/224 |
| 5,358,161 A * | 10/1994 | Perugini | | 224/679 |
| 5,397,040 A * | 3/1995 | Lee | | 224/679 |
| 5,402,596 A * | 4/1995 | Gillming, Jr. | | 43/54.1 |
| 5,433,930 A * | 7/1995 | Taschner | | 422/300 |
| D361,201 S * | 8/1995 | Chaney et al. | | D3/260 |
| 5,441,709 A * | 8/1995 | Berry, Jr. | | 206/480 |
| 5,488,799 A * | 2/1996 | Hauschild | | 43/54.1 |
| 5,505,356 A * | 4/1996 | Noriega et al. | | 224/681 |
| 5,542,204 A * | 8/1996 | Heaney | | 43/4 |
| 5,571,228 A * | 11/1996 | McMurtrie | | 43/21.2 |
| 5,573,116 A * | 11/1996 | Zink | | 206/557 |
| 5,573,167 A * | 11/1996 | Bebb et al. | | 43/21.2 |
| 5,628,141 A * | 5/1997 | Crawford | | 43/54.1 |
| 5,797,212 A * | 8/1998 | Kistner et al. | | 43/21.2 |
| 5,855,274 A * | 1/1999 | Piao | | 206/478 |
| 5,996,267 A * | 12/1999 | Breckenridge | | 43/12 |
| 6,036,067 A * | 3/2000 | Alcorn | | 43/54.1 |
| 6,047,491 A * | 4/2000 | De Busk | | 43/21.2 |
| 6,052,936 A * | 4/2000 | Garcia | | 43/4 |
| 6,068,402 A * | 5/2000 | Freese et al. | | 383/121.1 |
| 6,119,390 A * | 9/2000 | Dickie | | 43/54.1 |
| 6,189,258 B1 * | 2/2001 | Anderson | | 43/54.1 |
| 6,267,276 B1 * | 7/2001 | Cook | | 43/54.1 |
| 6,382,490 B1 * | 5/2002 | Divincenzo | | 43/54.1 |
| 6,487,814 B1 * | 12/2002 | Arredondo et al. | | 43/54.1 |
| 6,591,542 B1 * | 7/2003 | Jordan | | 43/21.2 |
| 6,729,064 B2 * | 5/2004 | Congialosi | | 43/21.2 |
| 6,805,270 B1 * | 10/2004 | Fraser | | 224/922 |
| 6,865,841 B2 * | 3/2005 | Wieringa | | 206/315.11 |
| 6,920,993 B2 * | 7/2005 | Sheng-Bin | | 220/6 |
| 6,923,357 B2 * | 8/2005 | Smith | | 43/21.2 |
| 7,013,596 B1 * | 3/2006 | Moore | | 43/54.1 |
| 7,140,148 B1 * | 11/2006 | Williams, II | | 43/54.1 |
| 7,163,340 B2 * | 1/2007 | Godshaw et al. | | 383/121.1 |
| 7,451,872 B1 * | 11/2008 | Allen | | 206/315.11 |
| 7,534,041 B2 * | 5/2009 | Godshaw et al. | | 383/121.1 |
| 7,594,354 B1 * | 9/2009 | Chadwick | | 43/21.2 |
| 7,676,983 B2 * | 3/2010 | Jenkins | | 43/26 |
| 2002/0139036 A1 * | 10/2002 | Smith | | 43/21.2 |
| 2002/0162272 A1 * | 11/2002 | Pripusich | | 43/54.1 |
| 2004/0195144 A1 * | 10/2004 | Smith | | 206/565 |
| 2005/0150808 A1 * | 7/2005 | Sarna et al. | | 206/557 |
| 2006/0042152 A1 * | 3/2006 | Pearson | | 43/54.1 |
| 2006/0185222 A1 * | 8/2006 | Alvarez | | 43/54.1 |
| 2007/0051032 A1 * | 3/2007 | Moffitt | | 43/54.1 |
| 2007/0152009 A1 * | 7/2007 | Fishman | | 224/676 |
| 2007/0289199 A1 * | 12/2007 | Looney | | 43/54.1 |
| 2008/0066371 A1 * | 3/2008 | Hoover | | 43/54.1 |
| 2008/0222941 A1 * | 9/2008 | Scrimgeour | | 43/54.1 |
| 2009/0301915 A1 * | 12/2009 | Howton | | 206/557 |
| 2010/0084301 A1 * | 4/2010 | Trapp et al. | | 206/481 |

FOREIGN PATENT DOCUMENTS

| | | | | |
|---|---|---|---|---|
| GB | | 2343098 A | * | 5/2000 |
| WO | | WO 00/03587 A1 | * | 1/2000 |
| WO | | WO 2007111513 A1 | | 10/2007 |

* cited by examiner

FIG. 9

STRIPPING BASKET FOR FLY FISHING

FIELD OF THE INVENTION

The present invention relates to fishing equipment. More particularly, the present invention is directed to a stripping basket which is suitable for use during fly fishing.

BACKGROUND

In the sport of fly fishing and fly casting, the user (fisherman) attempts to place a hook, disguised or dressed with colorful lightweight natural or synthetic materials, in a particular location where it will hopefully attract the attention, and incite the strike of a fish. The fly itself usually has very little weight and it, together with its camouflaged hook, are attached to the free end of a length of light test line, such as light monofilament line which is then attached to a heavier line usually specially designed for fly casting. The fly line is initially stored on a reel which is located at the butt end of a light weight fly casting rod. The sport of fly casting and fly fishing is not similar to other types of fishing, such as surf casting in which a single cast is sufficient to propel a hook and a sinker or a lure away from the fisherman and to pull the attached line off its reel. In fly casting, the fly, hook and its associated line is positioned aloft by a series of movements of the fly casting rod in a somewhat back and forth or whip-like fashion which energizes and casts the line. As is well known in the art of fly casting and fly fishing, the force of the fly being cast is not sufficient to propel the line in a cast or to pull it off the reel upon which it is stored.

A fly fisherman typically pulls a length of line off the reel of his fly casting rod and deposits this pulled or stripped line either directly onto the surface of the body of water in which he is wading, or more typically into or onto some type of line support that he has attached to himself. Fly fishermen do not generally use the reel to move the line or fly. The line and fly are pulled or moved manually by the fly fisherman. The retrieved line is then either held in the fisherman's hand or deposited on the water or on the floor of a boat awaiting the next cast. Many fly casters have constructed crude stripped line receiving devices from plastic dish pans or other similar generally shallow plastic receptacles. A variety of stripping baskets are available today. However, they all have shortcomings that detract from the enjoyment and pleasure that would otherwise be derived from the sport. These shortcomings may include allowing for a limited range of motion while "stripping" the line, as well as ease of storage for travel. Furthermore, since fly fishing from a boat may involve working in a confined and crowded area, it is desirable to have a basket that is conducive for use in such an environment. Therefore, it is desirable to have an improved stripping basket to overcome the shortcomings of the currently available stripping baskets.

SUMMARY OF THE INVENTION

The present invention provides an improved stripping basket for fly fishing. The stripping basket is easily compacted for stowing while on board a boat, or for packing the stripping basket in a suitcase for travel to a fishing destination. The basket comprises a plurality of removable line separators and drainage holes in a base plate. The base plate folds towards the front wall of the stripping basket. The front wall has a plurality of slits that correspond to the arrangement of the line separators. In the compact configuration, the stripping basket folds, and the line separators traverse the slits to allow for considerable reduction in the amount of space taken up by the basket. With the line separators still attached to the base plate, the stripping basket can be quickly unfolded for use. This is convenient when on board a boat, awaiting a turn to fish. For longer term storage, such when packing in a suitcase for travel, the line separators can be removed for maximum portability.

In addition to the portability advantages, various other advantages are provided by the stripping basket of the present invention. Since fly fishing involves considerable technique, it is desirable to maximize the range of motion allowed when pulling the line in (stripping). The present invention provides a convenient means for wearing the stripping basket below waist level, with adjustable height and angles. This allows a user to establish a comfortable position for the stripping basket. Quick release fasteners (such as hook-and-loop fasteners, snaps, and buttons, for example) allow the basket to be quickly removed or attached from a waist belt that is worn by the user. Furthermore, a rod holding strap may be optionally included in the stripping basket. This provides further convenience during fly fishing, as it is often necessary to make adjustments to lines or lures that require both hands. These and other advantages will become more apparent by reading the detailed description that follows.

DETAILED DESCRIPTION

Figure 1:
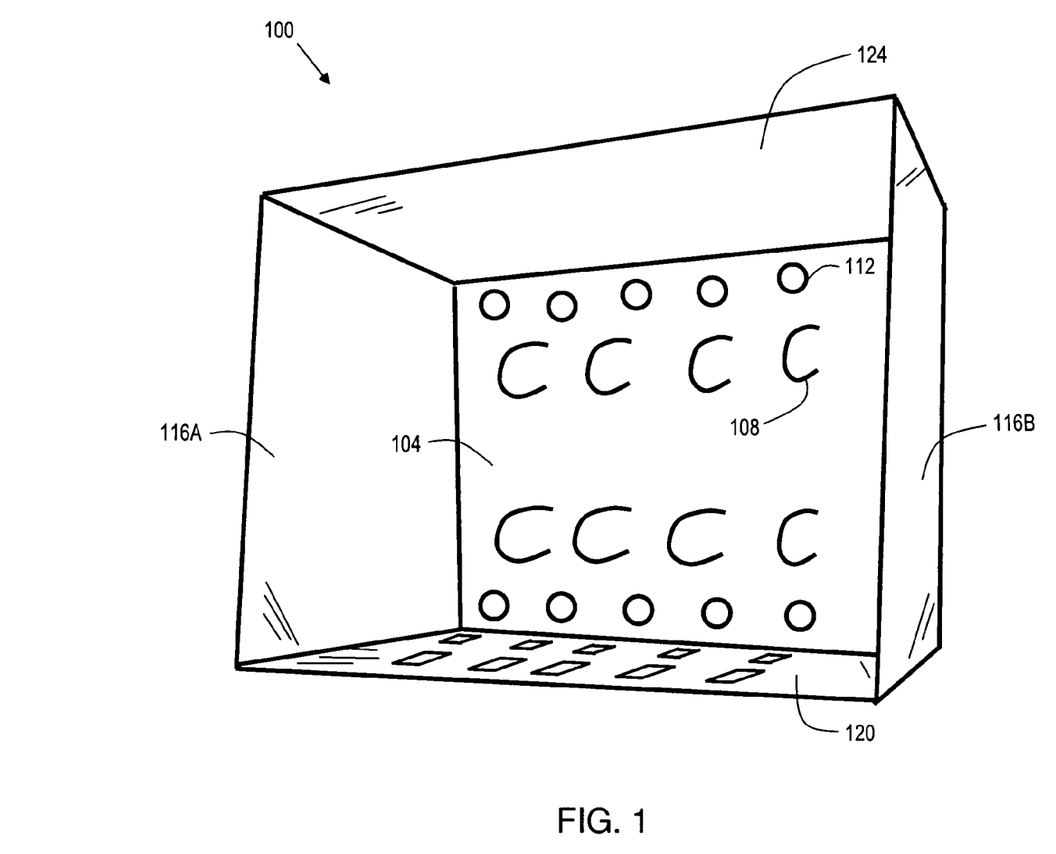
FIG. 1 shows a top-down perspective view of an exemplary embodiment of the present invention.

FIG. 1 shows a top-down perspective view of a stripping basket 100 in accordance with the present invention. The stripping basket 100 comprises a box structure comprised of front wall 120, two side walls 116A and 116B, and rear wall 124. In one embodiment, the front wall 120 is made of a sturdy plastic, and the side walls 116A and 116B, and rear wall 124 are comprised of nylon-covered panels. Side walls 116A and 116B are foldable. The base plate 104 serves as the bottom of the interior of basket 100. The base plate 104 has a plurality of line separators, indicated generally as 108. Note that for the sake of clarity, not all of the line separators in FIG. 1 are indicated with a reference number. The base plate 104 also has a plurality of drainage holes 112. Note that for the sake of clarity, not all of the drainage holes in FIG. 1 are indicated with a reference number.

In this embodiment, each line separator 108 is a "loop" structure that extends from base plate 104, and loops back to base plate 104. Hence, line separator 108 is referred to as a loop line separator. The purpose of the line separators 108 is to reduce the risk of entanglement of the fishing line as it is placed into the basket 100. In one embodiment, each line separator 108 is formed of heavy-duty nylon line, such as that used in a line trimmer for trimming weeds. The line separators 108 are preferably held in place via a friction fit, and are removable for storage, or to configure the basket 100 with the desired number and arrangement, per user preference. In FIG. 1, the line separators 108 are arranged in two rows. However, other configurations are possible, and within the scope of the present invention.

Figure 2:
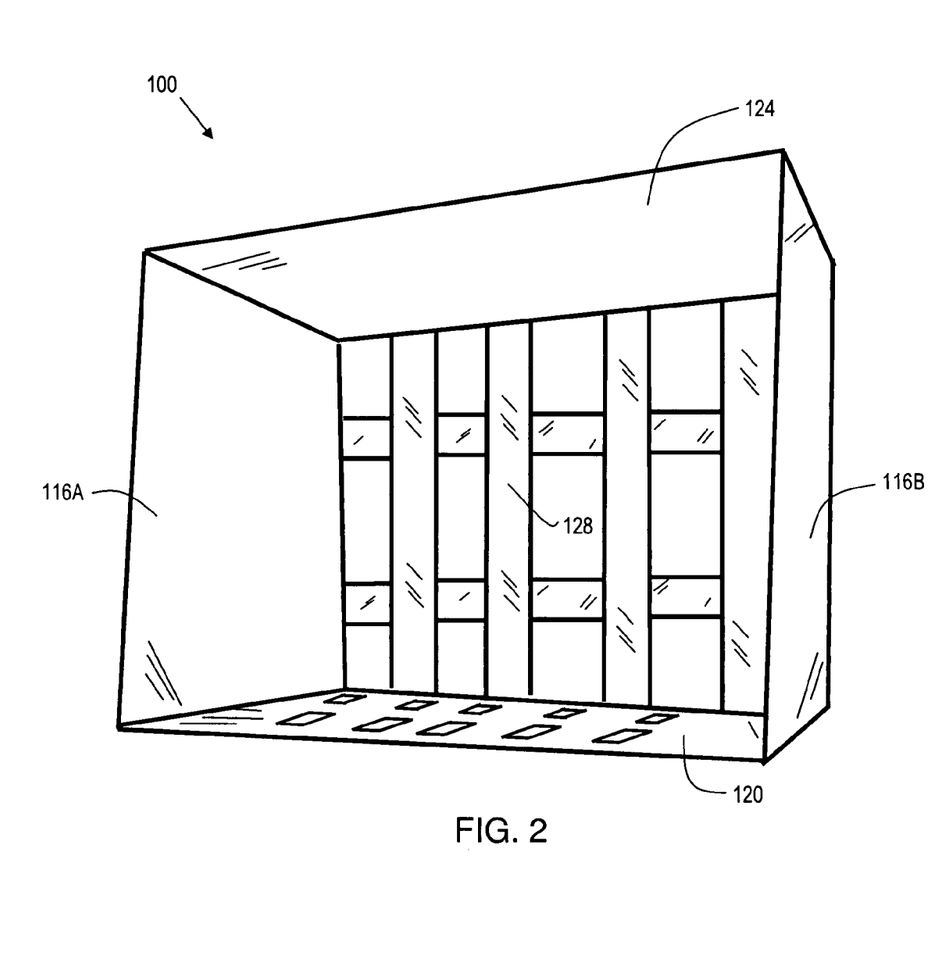
FIG. 2 shows an additional top-down perspective view of the embodiment of FIG. 1, with the base plate removed.

FIG. 2 shows an additional top-down perspective view of the embodiment of FIG. 1, with the base plate 104 removed. The base plate 104 is removable to facilitate compact storage. The base plate 104 is supported by a mesh 128 that is connected to the bottom of the front wall 120, rear wall 124, and side walls 116A and 116B. The mesh 128 is pliable, and may be formed by nylon straps.

Figure 3:
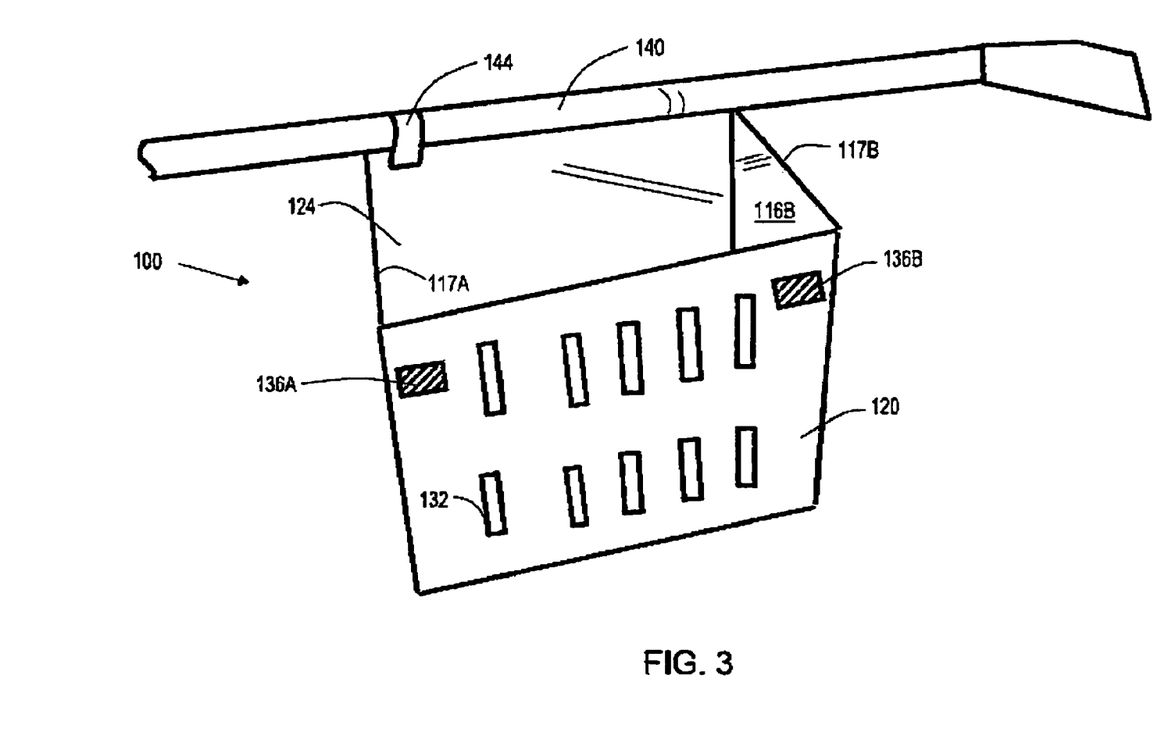
FIG. 3 shows a front perspective view of an exemplary embodiment of the present invention.
Figure 3A:
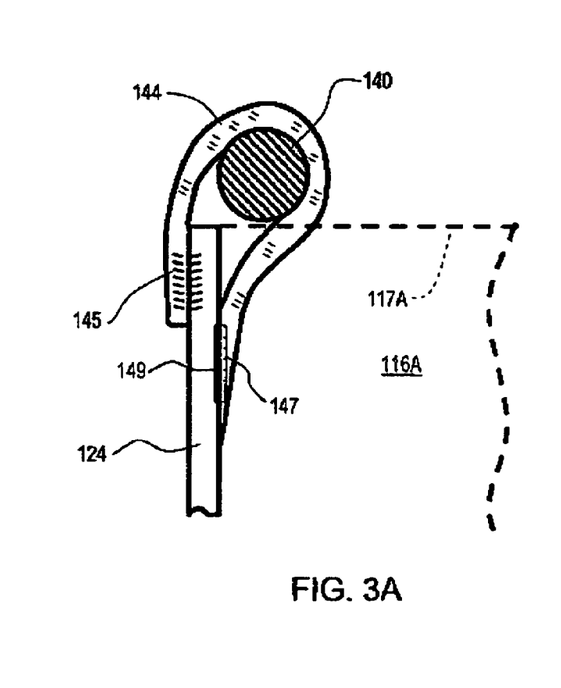
FIG. 3A shows a detailed view of the embodiment of FIG. 3.

FIG. 3 shows a front perspective view of the embodiment of FIG. 1. In this view, the front wall 120 is shown to have a plurality of slits 132, and two fasteners, 136A and 136B. The purpose of the slits 132 is to facilitate quick and convenient collapsing of the stripping basket 100. Note that for the sake of clarity, not all of the slits in FIG. 3 are indicated with a reference number.

FIG. 3 also illustrates the use of the optional rod holder 144, which fastens around a fishing rod 140, in order to help support the rod 140 on basket 100. Rod 140 then rests on upper edge 117B of side wall 116B, and upper edge 117A of side wall 116A (see FIG. 2). As shown in FIG. 3B, rod holder 144 may be implemented as a nylon strap that is attached (e.g. sewn) to basket 100, via stitching 145, and has fastening means such as a snap, button, or hook-and-loop fastener 147, to attach a corresponding fastener 149 on the interior side of the rear wall 124 of the basket 100, thereby securing the fishing rod 140 in place. This feature may be used to free the user's hands. This can be useful during fly fishing to prepare fishing lures, for example. Fasteners 136A and 136B may be hook-and-loop fasteners, such as VELCRO. Alternatively, snaps, buttons, or other fasteners may be used, without departing from the scope of the present invention.

Figure 4:
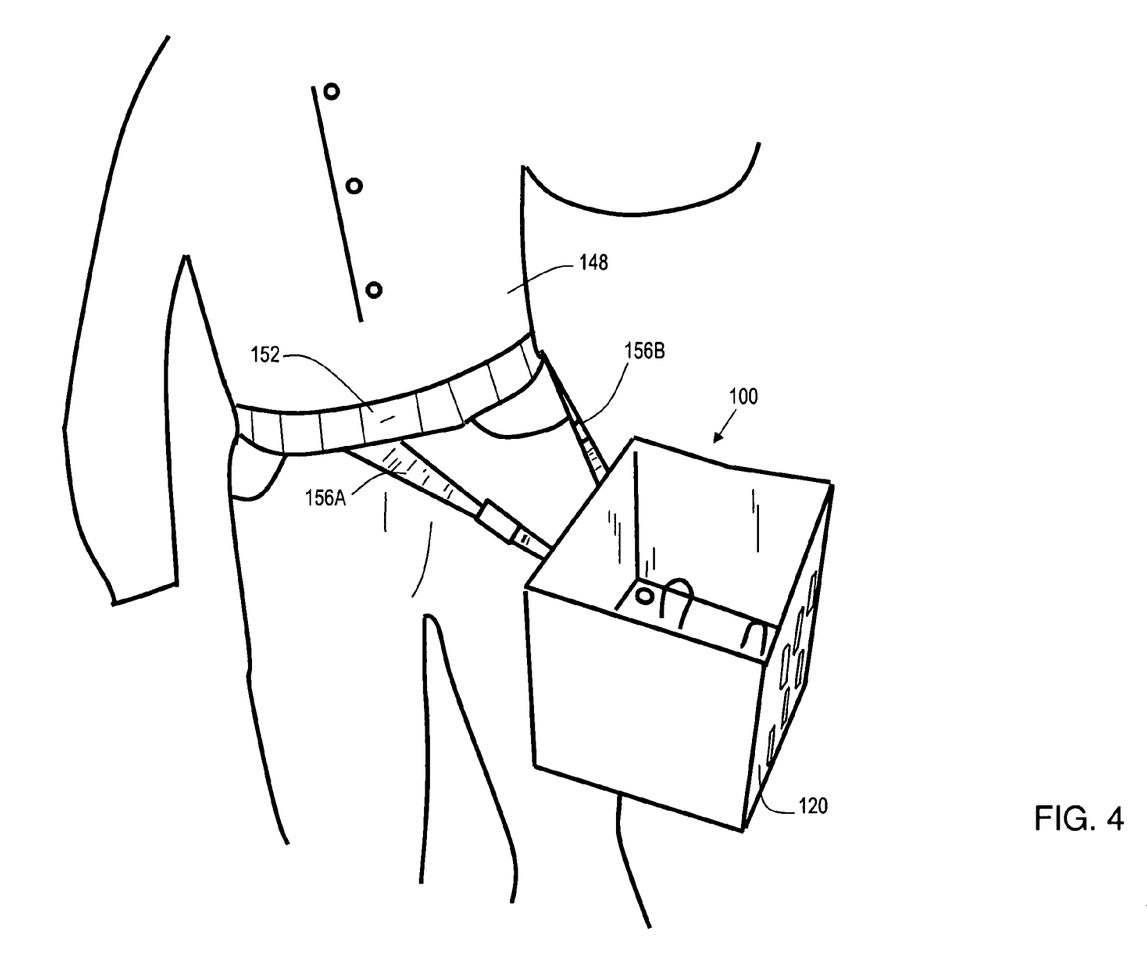
FIG. 4 shows a perspective view of a stripping basket in accordance with the present invention being worn by a user.

FIG. 4 shows a perspective view of a stripping basket 100 in accordance with the present invention being worn by a user 148. To wear the basket 100, the user 148 wears a belt 152 around the waist. Attached to waist belt 152 are height adjustment straps, 156A and 156B. The length of straps 156A and 156B are adjustable by the user. The basket 100 is connected to the adjustment straps 156A and 156B, such that front wall 120 is facing away from user 148. By varying the length of the straps 156A and 156B, it is possible to achieve a wide variety of height and angle combinations. In FIG. 4, strap 156A is adjusted to be longer than strap 156B. This creates a forward-facing angle for basket 100. The straps 156A and 156B also allow the basket 100 to be worn lower on the body. The forward-facing angle, combined with the lower position of the basket 100, provide for an improved range of motion for the user 148 during the stripping of fishing line. Note that while the illustrated embodiment uses two adjustment straps, it is possible to have more than two adjustment straps, without departing from the scope of the present invention.

Figure 5:
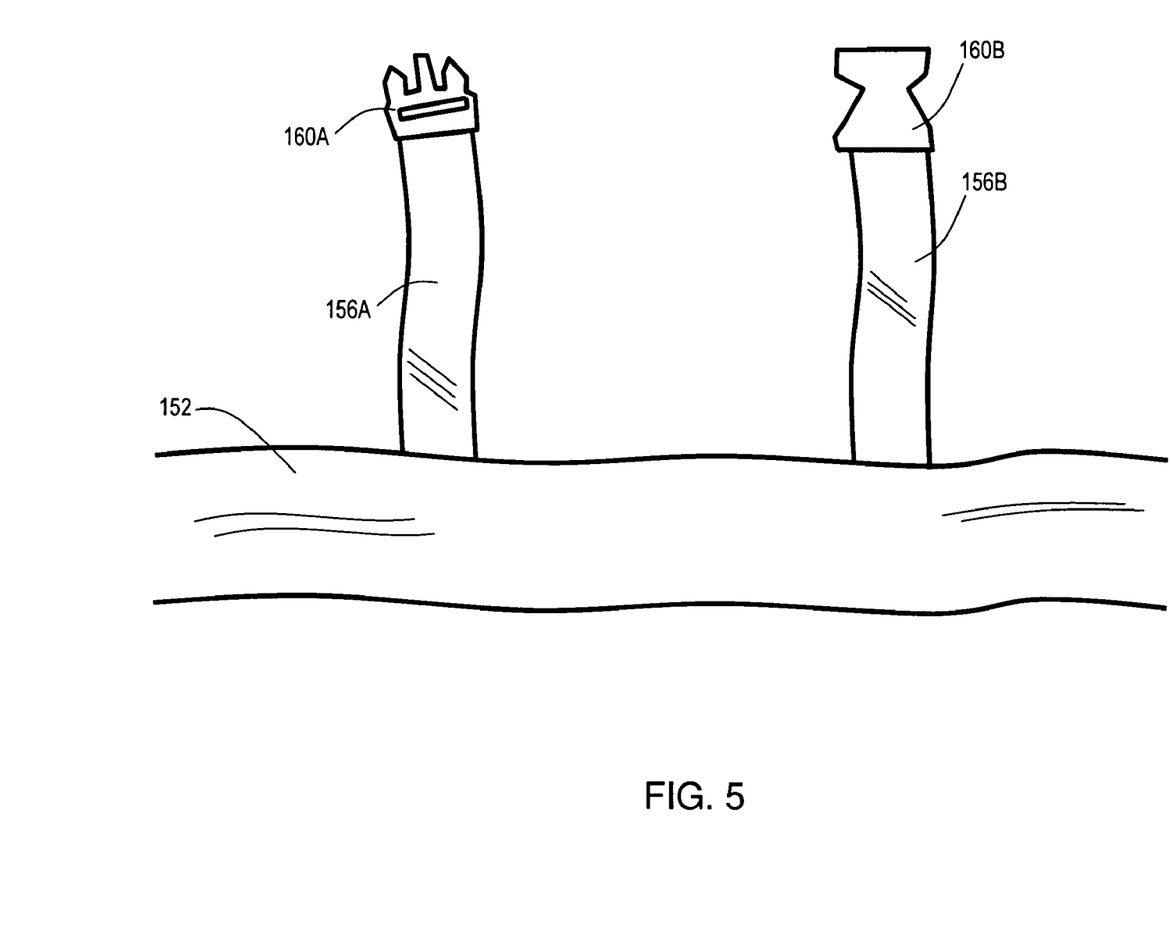
FIG. 5 shows a detailed view of the harness used with a stripping basket in accordance with the present invention.

FIG. 5 shows a detailed view of the belt 152 used with a stripping basket in accordance with the present invention. Attached to belt 152 are two height adjustment straps, 156A and 156B. The length of straps 156A and 156B are adjustable by the user via standard adjustment loops (not shown). Strap 156A has male fastener 160A, and strap 156B has female fastener 160B. During normal use, strap 156A and strap 156B are fastened to a stripping basket. However, there are situations where it is desirable to remove the stripping basket, such as on a crowded boat, while awaiting a turn to fish. By having complimentary fasteners, strap 156A may be fastened to strap 156B when the stripping basket is removed, keeping the straps 156A and 156B from dangling, and possibly getting caught on something, while on a boat.

Figure 6:
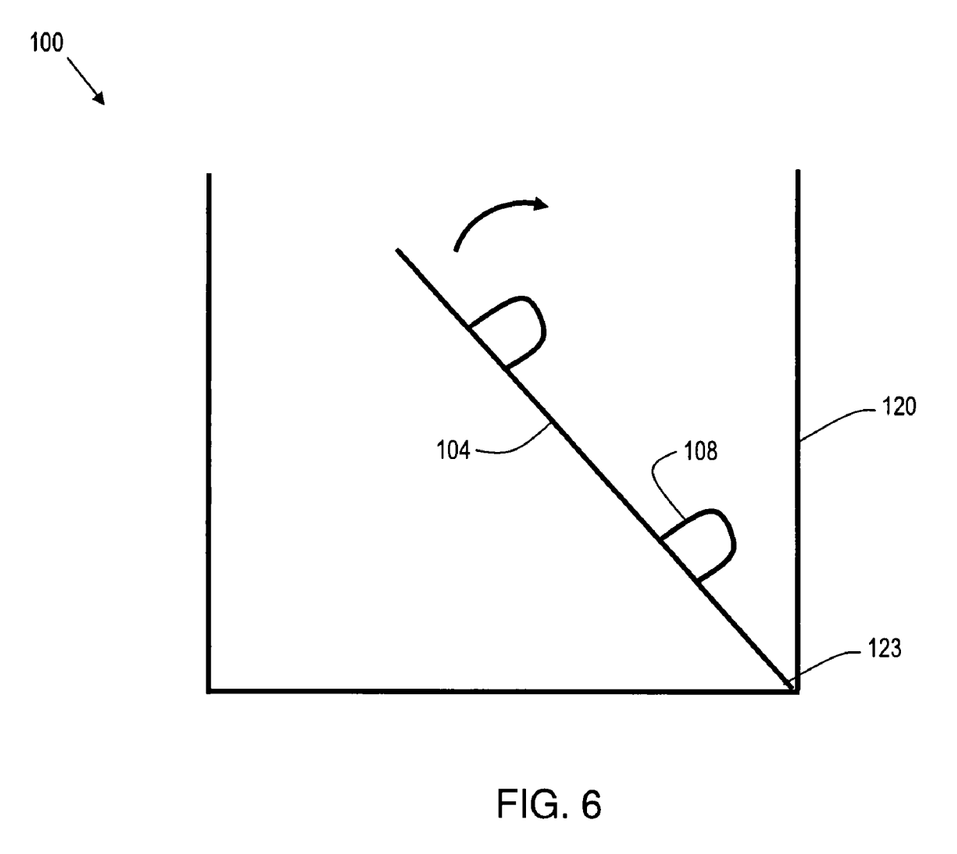
FIG. 6 shows a side cutaway view of a stripping basket in accordance with the present invention during preparation for stowing.

FIG. 6 shows a side cutaway view of a stripping basket 100 in accordance with the present invention during preparation for stowing. Base plate 104 is folded towards front wall 120 (as indicated by arrow). The line separators 108 are configured to fit through slits 132 (FIG. 3) to provide optimal compactness during stowing. In one embodiment, base plate 104 is removable, and is simply placed against front wall 120 for storage. In another embodiment, the base plate 104 is foldable. In this embodiment, the base plate 104 is attached to stripping basket 100 at pivot point 123, thereby allowing the base plate 104 to be folded in to position against front wall 120.

Figure 7:
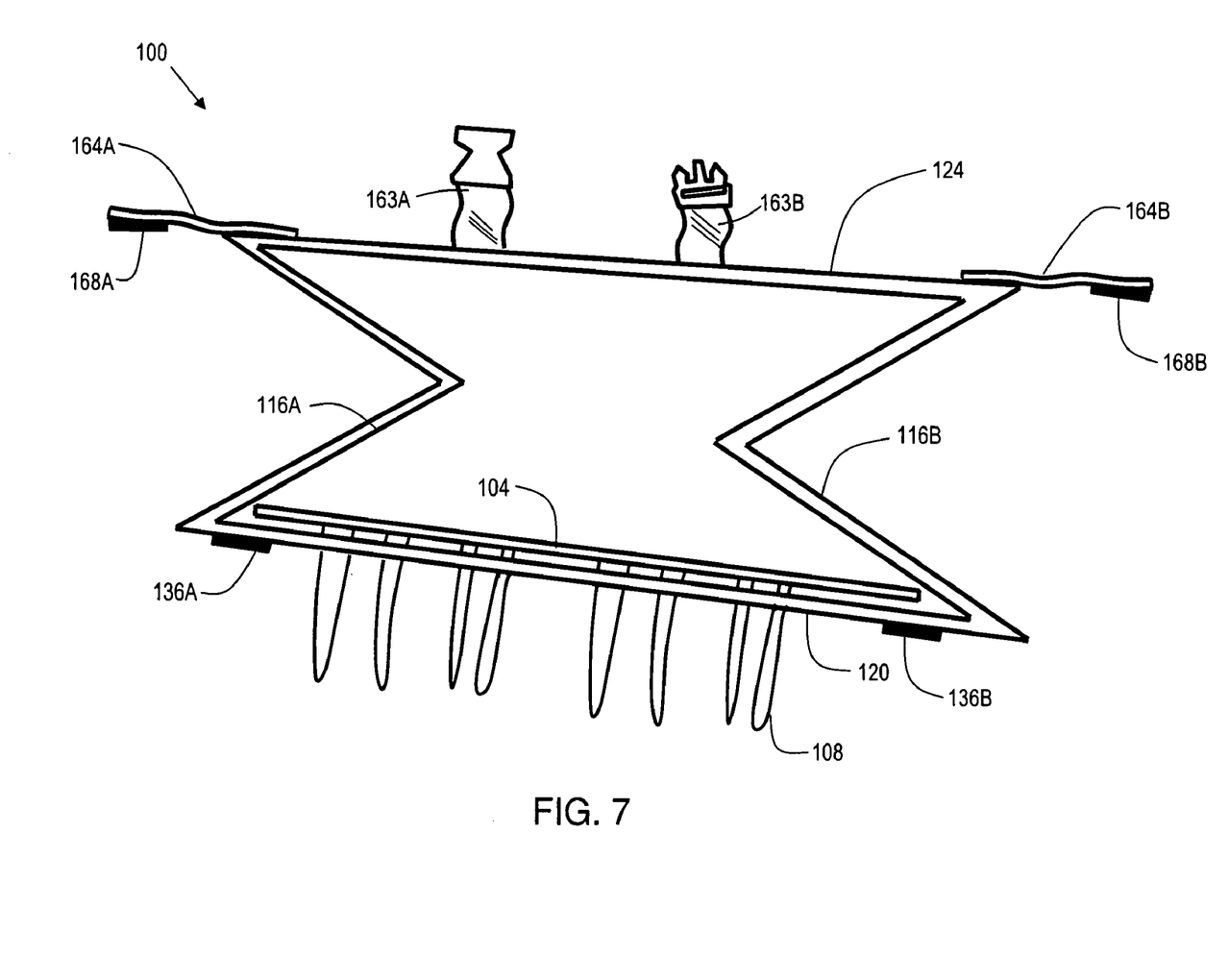
FIG. 7 shows a top-down view of a stripping basket in accordance with the present invention during preparation for stowing.

FIG. 7 shows a top-down view of a stripping basket 100 in accordance with the present invention during preparation for stowing. After base plate 104 is folded against front wall 120, with line separators 108 protruding through slits 132 (FIG. 3), the side walls 116A and 116B are collapsed to compact the basket 100. In this figure, basket straps 163A and 163B are visible, and are attached to rear wall 124 of basket 100. During use, strap 163A attaches to strap 156A (FIG. 4), and strap 163B attaches to strap 156B (FIG. 4). Straps 164A and 164B comprise fasteners 168A and 168B, respectively, which fasten to fasteners 136A and 136B, respectively, when the basket 100 is stowed. In one embodiment, the fastening means comprises hook-and-loop fasteners. However, another fastening means, including, but not limited to, snaps, buttons, or clips, may be used, without departing from the scope of the present invention.

Figure 8:
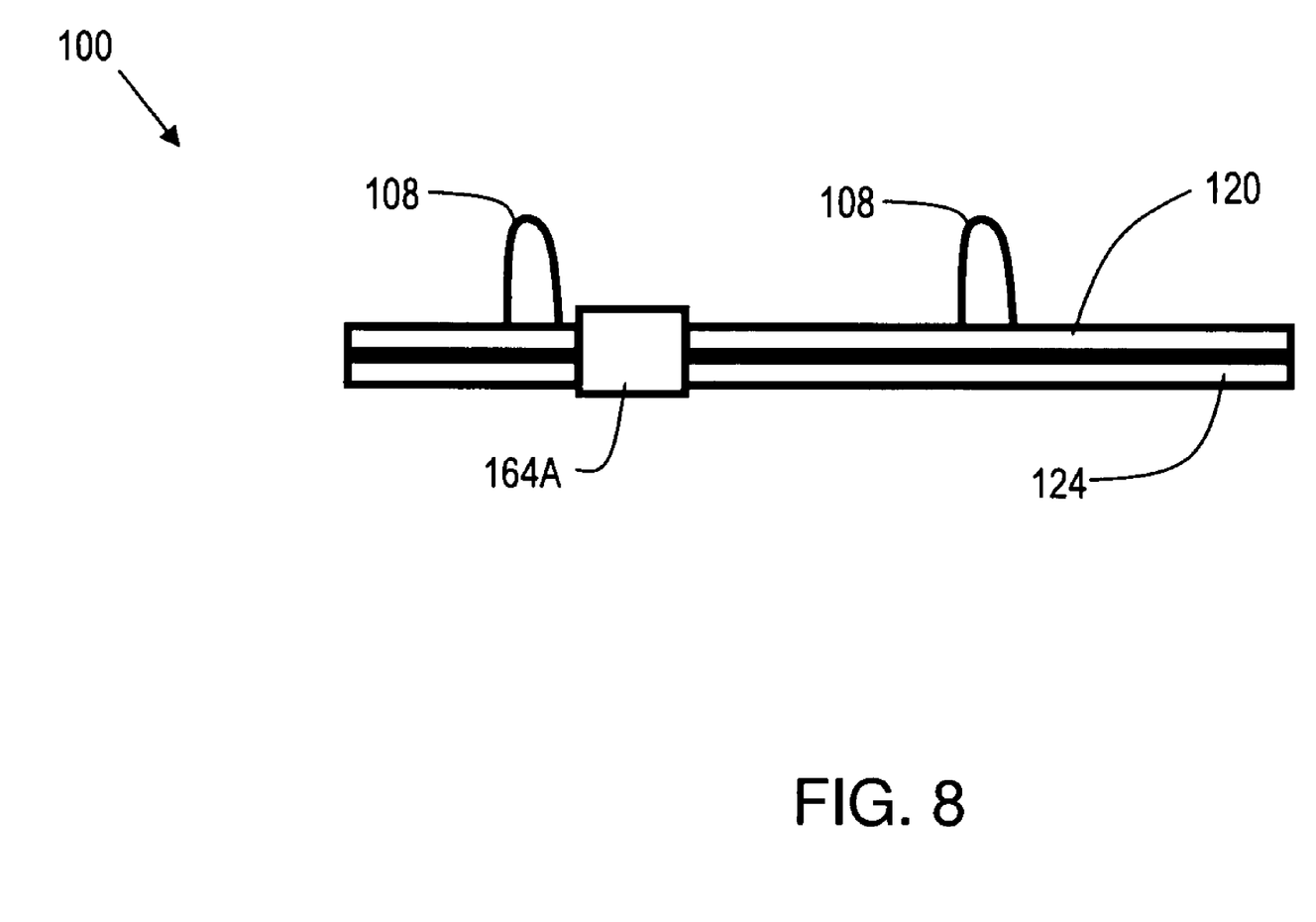
FIG. 8 shows a side view of a stripping basket in accordance with the present invention in a stowed configuration.

FIG. 8 shows a side view of a stripping basket 100 in accordance with the present invention in a stowed configuration. In this configuration, rear wall 124 is placed against front wall 120, with line separators 108 protruding through front wall 120. The rear wall 124 is held to the front wall 120 via straps 164A and 164B (164B is not visible in this view).

Figure 9:
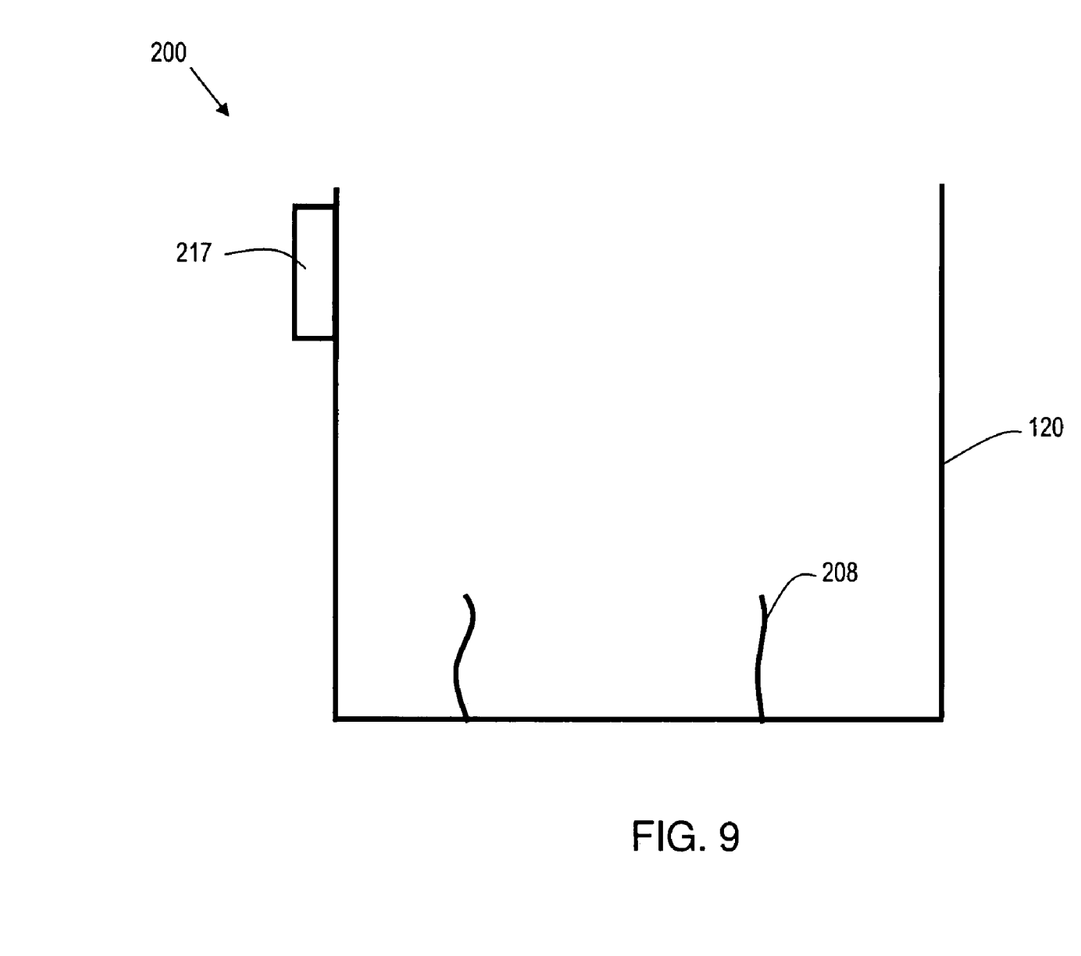
FIG. 9 shows a side view of an alternative embodiment of the present invention.

FIG. 9 shows a side view of an alternative embodiment of the present invention. Stripping basket 200 has line separators 208, which are relatively straight, as opposed to the "loop" line separator 108 shown in the previous figures. Hence, line separator 208 is referred to as a straight line separator. Stripping basket 200 further comprises storage compartment 217, which is convenient for storing additional line separators 208, or other fly fishing apparatus.

It will be understood that the present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A stripping basket of box like structure comprising:
 a front wall, a rear wall, and two foldable side walls, each of said front wall, said rear wall, and said two foldable side walls having a bottom edge;

a flexible, pliable mesh connected to the bottom edges of the front, rear, and side walls;

a rigid base plate overlying the flexible mesh in the operative set up position of the box like structure;

a plurality of loop line separators removably mounted on said base plate in a predetermined array to prevent entanglement of the fishing line when placed on the basket to prepare for casting, wherein the line separators extend upwardly from said base plate;

said rigid base plate pivotable to a position facing the front wall wherein the line separators extend through openings in the front wall so that the side walls can be pivoted inwardly or collapsed to compact the box like structure.

2. A stripping basket, comprising:

a box structure comprising a rear wall, a front wall, and two foldable side walls;

a foldable base plate;

a plurality of line separators disposed on said base plate;

a plurality of openings arranged on said front wall, wherein the plurality of openings are arranged to correspond to positions of said plurality of line separators;

a waist belt; and a plurality of adjustment straps, wherein a first end of each of said adjustment straps is attached to the stripping basket and a second end of each of said adjustment straps is attached to said waist belt; and means for holding a fishing rod comprising a nylon strap attached to said basket at one end of said nylon strap and comprising a first fastener at an other end of said nylon strap, and a second on an interior side of the rear wall, whereby the nylon strap is configured and disposed to hold a fishing rod.

3. A stripping basket, comprising:

a box structure comprising a rear wall, a front wall, and two foldable side walls, said box structure having bottom edges defined by bottom edges of said rear wall, said front wall, and said two foldable side walls;

a pliable mesh disposed and attached to the bottom edges of the box structure;

a removable base plate disposed on said pliable mesh;

a plurality of line separators disposed on said base plate;

a plurality slits arranged on said front wall, wherein the plurality of slits are arranged to correspond to the positions of said plurality of line separators;

a waist belt;

a plurality of adjustment straps, wherein a first end of each of said adjustment straps is attached to the box structure and a second end of each of said adjustment straps is attached to said waist belt; and means for holding a fishing rod comprising a nylon strap attached to said basket at one end of said nylon strap and comprising a first fastener at an other end of said nylon strap, and a second fastener on an interior side of the rear wall, whereby the nylon strap is configured and disposed to hold a fishing rod.

* * * * *